United States Patent Office 3,733,338
Patented May 15, 1973

3,733,338
1-OXO-ISOCHROMENES
Masayasu Kimura and Masaya Kokubo, Toyama-ken,
Japan, assignors to Ikeda Pharmaceutical Industry Co.,
Ltd.
No Drawing. Filed July 29, 1971, Ser. No. 167,473
Int. Cl. C07d 7/18
U.S. Cl. 260—343.2 R                                       4 Claims

ABSTRACT OF THE DISCLOSURE

Compounds of th formula

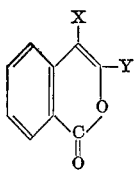

wherein X is a phenyl group having a substituent selected from alkoxy, halogen, hydroxy or amino groups, and Y is a hydrogen atom or a carboxyl group, are useful as medicines for humans and animals because of their high anti-allergic properties.

---

This invention relates to a new compound of the general formula

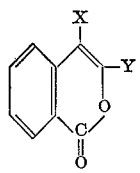  (I)

wherein X is a phenyl group having a substituent selected from alkoxy, halogen, hydroxy or amino groups, and Y is a hydrogen atom or a carboxyl group. The compounds defined above are new and useful as medicines for humans and animals because of their high anti-allergic properties.

The compounds of the present invention can be prepared in various ways which per se are well known in the art of organic synthesis.

Among the compounds of the Formula I those where X is taken as an alkoxyphenyl, halophenyl or hydroxyphenyl group and Y is taken as a carboxyl group, i.e. the compounds of the Formula II

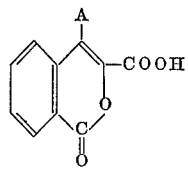  (II)

wherein A is a phenyl group substituted with alkoxy, halogen or hydroxy, can be synthesized by mono-decarboxylation of a compound of the Formula III

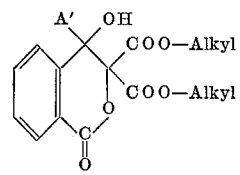  (III)

wherein A' is a phenyl group substituted with alkoxy or halogen. The starting compounds of the Formula III are obtained by the reaction of the metal salt of 2-substituted benzoyl benzoic acid with the halide of malonic acid dialkyl ester according to the method described in Japanese patent publication No. 15,263/1970 published on May 28, 1970. The conversion of the compound (III) to the compound (II) through the intended mono-decarboxylation can be effected by heating the compound (II) in a liquid medium, e.g. water, in the presence of an organic or inorganic acid, say formic acid, acetic acid, propionic acid, hydrochloric acid, sulfuric acid, phosphoric acid, hydrobromic acid, hydriodic acid, etc. The reaction temperature is not limited but the reflux temperature of the liquid medium used is preferred.

The compounds of the present invention, where X is taken as an alkoxyphenyl, halophenyl or hydroxyphenyl group and Y is taken as a hydrogen atom can be obtained by further decarboxylation of the compound (II) according to the following equation:

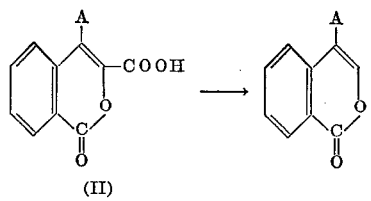

(II)

The intended decarboxylation reaction can be advantageously carried out in the presence of a base serving as a solvent. Glycerine, ethanolamine, dimethyl aniline or quinoline is the preferred base. Addition of copper dust to the reactant system is recommendable. The reaction temperature usually will be within the range of 150 to 200° C., but this is not limitative.

As an alternative method for the preparation of a compound of the Formula I where X is a hydroxyphenyl group and Y is a hydrogen or a carboxyl group, a compound having an appropriate alkoxyphenyl group corresponding to the desired group X can be subjected to de-etherification at said alkoxyphenyl group. The intended de-etherification reaction is effected by heating of said alkoxyphenyl-bearing isochromene compound in the presence of hydrobromic acid, hydriodic acid, aluminum chloride, zinc chloride, boron tribromide, aniline hydrochloride, pyridine hydriodide or pyridine hydrochloride. Other known de-etherification methods described in Experimental Chemistry, vol. 19 page 165, edited by the Chemical Society of Japan and published by Maruzen Co., Ltd. also are applicable to the present invention. The reaction may be carried out in a solvent medium, e.g. water or an organic solvent such as acetic acid or benzene. Hydriodic or hydrochloric acid is recommendable because it acts as a solvent and a catalyst at the same time. The reaction temperature approximating to 100° C. is usually preferred without limitation. The alkoxy portion of the alkoxyphenyl group susceptible to de-etherification is, for example, methoxy, ethoxy, propoxy, isopropoxy, butoxy, tert.-butoxy or the like lower alkoxy.

The compound of the present invention wherein X is taken as an aminophenyl group and Y is a hydrogen atom can be prepared by reduction of 1-oxo-4-nitrosubstiuted-phenyl-isochromene compound, e.g. 1-oxo-4-(3-nitrophenyl)isochromene which is known in Chemical Abstracts, vol. 59, 9010u to 9011e. The intended reduction reaction can be effected by any known way, e.g. using the combination of a metal (iron, tin, zinc, etc.) with an acid (HCl or acetic acid); the combination of sodium, sodium amalgam, aluminum amalgam, zinc, iron or the like metal with water or an alcohol; ammonium sulfides such as amonium sulfide, ammonium hydrogen sulfide, etc. alkali sulfides such as sodium sulfide, sodium polysulfide, sodium hydrogen sulfide, etc. or hydrogen sulfide; sodium thionite or sodium bisulfite; phenylhydrazine, hydrazine or ammonia; titanium trichloride-hydrochloric acid; or lithium aluminum hydride. Catalytic hydrogenation using any known catalyst, e.g. palladium, platinum, nickel (e.g. Raney nickel), cobalt, etc. is also usable for the intended reduction. This is usually conducted in a suitable solvent, e.g. water, hydrochloric acid, acetic acid, methanol or ethanol, which is selected depending on the type of a reducing agent or a catalyst used.

Now the present invention will be illustrated in conjunction with the following examples.

EXAMPLE 1

7.0 g. of diethyl 1-oxo-4-hydroxy-4-(4-methoxyphenyl)-3,3-isochromane-dicarboxylate is dissolved in 70 cc. of glacial acetic acid and 105 cc. of concentrated hydrochloric acid and the resulting solution is heated under reflux for two hours. The reaction mixture is gradually added to a large amount of water with stirring. The crystalline mass is separated by suction filtration. It is washed with water, dried and then dissolved in chloroform. Undissolved material is removed by filtration. The filtrate is diluted with ligroin and allowed to stand thereby to yield 1.8 g. of 1-oxo-4-(4-methoxyphenyl)-3-isochromene-carboxylic acid, as colorless crystalline needles, M.P. 200° C.

Calcd. for $C_{17}H_{12}O_5$ (percent): C, 68.92, H, 4.08. Found (percent): C, 69.14, H, 3.98.

EXAMPLE 2

2.0 g. of diethyl 1-oxo-4-hydroxy-4-(2-methoxyphenyl)-3,3-isochromane-dicarboxylate is dissolved in 20 cc. of glacial acetic acid and 30 cc. of concentrated hydrochloric acid. The resulting solution is heated under reflux for 2 hours. The reaction mixture is worked up in the same manner as in Example 1, thereby to yield 0.5 g. of 1-oxo-4-(2-methoxyphenyl)-3-isochromene-carboxylic acid, as colorless crystalline needles, M.P. 176–177° C.

Calcd. for $C_{17}H_{12}O_5$ (percent): C, 68.92, H, 4.08. Found (percent): C, 68.861, H, 4.079.

EXAMPLE 3

6.8 g. of diethyl 1-oxo-4-hydroxy-4-(3,4-dimethoxyphenyl)-3,3-isochromane-dicarboxylate is dissolved in 68 cc. of glacial acetic acid and 102 cc. of concentrated hydrochloric acid and the resulting solution is heated under reflux for two hours. The reaction mixture is gradually added to a large amount of water with stirring. The crystalline mass is separated by suction filtration. It is washed with water, dried and then dissolved in chloroform. Undissolved material is removed by filtration. The filtrate is diluted with ligroin and allowed to stand thereby to yield 0.6 g. of 1-oxo-4-(3,4-dimethoxyphenyl)-3-isochromene-carboxylic acid, as colorless or yellow crystalline needles, M.P. 242° C.

Calcd. for $C_{18}H_{14}O_6$ (percent): C, 66.26, H, 4.32. Found (percent): C, 66.004, H, 4.205.

EXAMPLE 4

7.0 g. of diethyl 1-oxo-4-hydroxy-4-(4-chlorophenyl)-3,3-isochromane-dicarboxylate is dissolved in 70 cc. of glacial acetic acid and 105 cc. of concentrated hydrochloric acid and the resulting solution is heated under reflux for two hours. The reaction mixture is gradually added to a large amount of water with stirring. The crystalline mass is separated by suction filtration. It is washed with water, and then recrystallized from methanol to yield 4.3 g. of 1-oxo-4-(4-chlorophenyl)-3-isochromene-carboxylic acid, as colorless crystalline prisms, M.P. 237° C.

Calcd. for $C_{16}H_9O_4Cl$ (percent): C, 63.91, H, 3.02. Found (percent): C, 63.895, H, 3.049.

EXAMPLE 5

6.8 g. of diethyl 1-oxo-4-hydroxy-4-(3,4-dichlorophenyl)-3,3-isochromane-dicarboxylate is dissolved in 68 cc. of glacial acetic acid and 102 cc. of concentrated hydrochloric acid and the resulting solution is heated with reflux for two hours. The reaction mixture is gradually added to a large amount of water with stirring. The crystalline mass is separated by suction filtration. It is washed with water, dried, washed with benzene and then recrystallized from 75% methanol thereby to yield 3.4 g. of 1-oxo-4-(3,4-dichlorophenyl)-3-isochromene-carboxylic acid, as colorless crystalline needles, M.P. 287° C.

Calcd. for $C_{16}H_8O_4Cl_2$ (percent): C, 57.34, H, 2.41. Found (percent): C, 57.589, H, 2.549.

EXAMPLE 6

7.0 g. of diethyl 1-oxo-4-hydroxy-4-(4-methoxyphenyl)-3,3-isochromane-dicarboxylate is dissolved in 70 cc. of glacial acetic acid and 105 cc. of concentrated hydrobromic acid (>47%) and the resulting solution is heated under reflux for 6 hours. The reaction mixture is gradually added to a large amount of water with stirring. The crystalline mass is separated by suction filtration. It is washed with water, dried and then washed with chloroform. Then, it is taken up in acetone. Undissolved material is removed by filtration. The filtrate is diluted with ligroin and allowed to stand thereby to yield 1.4 g. of 1-oxo-4-(4-hydroxyphenyl)-3-isochromene-carboxylic acid, as colorless crystalline needles, M.P. 272° C. This compound does not show any depression in melting point when mixed with an authentic sample.

EXAMPLE 7

65 cc. of a quinoline solution containing 6.5 g. of 1-oxo-4-(4-methoxyphenyl)-3-isochromene-carboxylic acid is mixed with a small amount of copper dust and heated at 180° C. on a paraffin bath until evolution of $CO_2$ gas ceases. The reaction mixture is cooled, treated with dilute hydrochloric acid and filtered by suction to recover the separated crystalline mass. This is washed with HCl and then with water and then recrystallized from methanol. 2.0 g. of 1-oxo-4-(4-methoxyphenyl)-isochromene as colorless needles, M.P. 126° C., is obtained.

Calcd. for $C_{16}H_{12}O_3$ (percent): C, 76.18, H, 4.80. Found (percent): C, 76.00, H, 4.79.

EXAMPLE 8

12 cc. of a quinoline solution containing 1.2 g. of 1-oxo-4-(2-methoxyphenyl)-3 - isochromene - carboxylic acid is mixed with a small amount of copper dust and heated at about 180° C. on a paraffin bath until evolution of $CO_2$ gas ceases. The reaction mixture is worked up in the same manner as in Example 7, thereby to obtain 0.5 g. of 1-oxo-4-(2-methoxyphenyl) isochromene as colorless needles, M.P. 134–135° C.

Calcd. for $C_{16}H_{12}O_3$ (percent): C, 76.18, H, 4.80. Found (percent): C, 76.027, H, 4.853.

EXAMPLE 9

10 cc. of a quinoline solution containing 1.0 g. of 1-oxo-4-(3,4-dimethoxyphenyl)-3-isochromene - carboxylic acid is added with a small amount of copper dust and heated at about 180° C. on a paraffin bath until evolution of $CO_2$ gas ceases. The reaction mixture is worked up in the same manner as in Example 7, thereby to obtain 0.3 g. of 1-oxo-4-(3,4-dimethoxyphenyl) isochromene as colorless needles, M.P. 148–150° C.

Calcd. for $C_{17}H_{14}O_4$ (percent): C, 72.33, H, 5.00. Found (percent): C, 72.505, H, 4.916.

EXAMPLE 10

30 cc. of a quinoline solution containing 3.0 g. of 1-oxo-4-(4-chlorophenyl)-3 - isochromene - carboxylic acid is mixed with a small amount of copper dust and heated at about 180° C. on a paraffin bath until evolution of $CO_2$ gas ceases. The reaction mixture is worked up in the same manner as in Example 7, thereby to obtain 1.4 g. of 1-oxo-4-(4-chlorophenyl) isochromene as colorless needles, M.P. 172° C.

Calcd. for $C_{15}H_9O_2Cl$ (percent): C, 70.19, H, 3.53. Found (percent): C, 69.976, H, 3.542.

EXAMPLE 11

28 cc. of a quinoline solution containing 2.8 g. of 1-oxo-4-(3,4-dichlorophenyl) - 3 - isochromene - carboxylic acid is mixed with a small amount of copper dust and heated at about 180° C. on a paraffin bath until evolution of $CO_2$ gas ceases. The reaction mixture is worked up in the same manner as in Example 7, thereby to obtain 0.9 g. of 1-oxo-4 - (3,4 - dichlorophenyl) isochromene as colorless needles, M.P. 165° C.

Calcd. for $C_{15}H_8O_2Cl_2$ (percent): C, 61.88, H, 2.77. Found (percent): C, 62.145, H, 2.823.

EXAMPLE 12

14 cc. of a quinoline solution containing 1.4 g. of 1-oxo-4-(4-hydroxyphenyl) - 3 - isochromene - carboxylic acid is mixed with a small amount of copper dust and heated at about 180° C. on a paraffin bath until evolution of $CO_2$ gas ceases. The reaction mixture is worked up in the same manner as in Example 7, thereby to obtain 0.5 g. of 1-oxo-4-(4-hydroxyphenyl) isochromene as a colorless crystalline powder, M.P. 212° C.

Calcd. for $C_{15}H_{10}O_3$ (percent): C, 75.62, H, 4.23. Found (percent): C, 75.340, H, 4.336.

EXAMPLE 13

37 cc. of a quinoline solution containing 3.7 g. of 1 - oxo - 4 - (3,4 - dihydroxyphenyl) - 3 - isochromene-carboxylic acid is mixed with a small amount of copper dust and heated at about 180° C. on a paraffin bath until evolution of $CO_2$ gas ceases. The reaction mixture is worked up in the same manner as in Example 7, thereby to obtain 0.8 g. of 1-oxo-4-(3,4-dihydroxyphenyl) isochromene as colorless crystalline needles, M.P. 208° C.

Calcd. for $C_{15}H_{10}O_4$ (percent): C, 70.86, H, 3.96. Found (percent): C, 70.856, H, 3.749.

EXAMPLE 14

3.0 g. of 1-oxo-4-(4-methoxyphenyl) - 3 - isochromene-carboxylic acid is dissolved in 45 cc. of 47% hydrobromic acid and 30 cc. of glacial acetic acid and the resulting solution is heated under reflux for 6 hours. The reaction mixture is gradually added to a large amount of water with stirring. The separated crystalline mass is recovered by filtration with suction. The mass is washed with water, dried and then washed several times with chloroform. It is taken up in acetone, and undissolved matter is separated by filtration. The filtrate is diluted with ligroin and allowed to stand. 1.5 g. of 1-oxo-4-(4-hydroxyphenyl)-3-isochromene as colorless needles, M.P. 272° C., is obtained.

Calcd. for $C_{16}H_{10}O_5$ (percent): C, 68.08, H, 3.57. Found (percent): C, 67.808, H, 3.554.

EXAMPLE 15

3.0 g. of 1-oxo-4-(4-methoxyphenyl)-3-isochromene is dissolved in 45 cc. of 47% hydrobromic acid and 30 cc. of glacial acetic acid and the resulting solution is heated under reflux for 6 hours. The reaction mixture is gradually added to a large amount of water with stirring. The separated crystalline mass is recovered by filtration with suction. The mass is washed with water and then recrystallized from 50% methanol to yield 1.3 g. of 1-oxo-4-(4-hydroxyphenyl)-isochromene, as colorless crystalline powder, M.P. 212° C. This compound does not show any depression in melting point when mixed with an authentic sample.

EXAMPLE 16

20 cc. of a benzene solution containing 2.0 g. of 1-oxo-4-(4-methoxyphenyl) - 3 - isochromene-carboxylic acid is mixed with 4 g. of anhydrous aluminum chloride and the resulting mixture is heated under reflux on a water bath for about 2 hours. Benzene is removed from the reaction mixture in vacuo and the residue is dissolved in 25 cc. of ice water containing 1 cc. of concentrated hydrochloric acid. The separated crystalline mass is recovered by suction filtration, washed with water, dried and then washed several times with chloroform. It is dissolved in acetone and undissolved material is removed by filtration. The filtrate obtained is diluted with ligroin and allowed to stand thereby to yield 0.1 g. of 1-oxo-4-(4-hydroxyphenyl)-3-isochromene - carboxylic acid, as colorless crystalline needles, M.P. 272° C. This compound does not show any depression in melting point when mixed with an authentic sample.

EXAMPLE 17

10.0 g. of 1-oxo-4-(3,4-dimethoxyphenyl) - 3 - isochromene-carboxylic acid is dissolved in 150 cc. of 49% hydrobromic acid and 100 cc. of glacial acetic acid and the resulting solution is heated under reflux for 6 hours. The reaction mixture is gradually added to a large amount of water with stirring. The separated crystalline mass is recovered by filtration with suction. The mass is washed with water and then recrystallized from 50% methanol to yield 6.0 g. of 1-oxo-4-(3,4-dihydroxyphenyl)-3-isochromene - carboxylic acid as pale yellow crystalline needles, M.P. 283° C.

Calcd. for $C_{16}H_{10}O_6$ (percent): C, 64.43, H, 3.38. Found (percent): C, 64.336, H, 3.257.

EXAMPLE 18

25 g. of stannous chloride is dissolved in 30 cc. of concentrated hydrochloric acid and then mixed with 50 cc. of ethanol. To the resulting mixture, 5.0 g. of 1-oxo-4-(3-nitrophenyl-isochromene is added portionwise. The resulting mixture is heated on a water bath for 30 minutes. The reaction mixture is freed from ethanol under reduced pressure and treated with a small amount of water in order to separate out the amine-tin complex. The complex is recovered by filtration and dissolved in warm water. Hydrogen sulfide is passed into the resulting solution to cause precipitation of tin. The precipitated tin is removed by filtration and the filtrate is concentrated under reduced pressure to form the amine hydrochloride which is then recrystallized from ethanol thereby to yield 1.3 g. of 1-oxo-4-(3-aminophenyl)-isochromene hydrochloride, as a pale brown or white crystalline powder, M.P. 254° C.

Calcd. for $C_{15}H_{12}C_2NCl$ (percent): C, 65.81, H, 4.42, N, 5.12. Found (percent): C, 66.050, H, 4.486, N, 4.940.

What is claimed is:

1. A compound of the formula

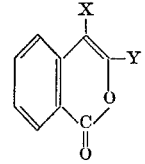

wherein X is a phenyl group substituted with a group selected from lower alkoxy, halogen, hydroxy and amino, and Y is a hydrogen atom or a carboxyl group.

2. A compound as claimed in claim 1, wherein X is a lower alkoxyphenyl, halophenyl or hydroxyphenyl group and Y is a hydrogen atom.

3. A compound as claimed in claim 1, wherein X is a lower alkoxyphenyl, halophenyl or hydroxyphenyl group and Y is a carboxyl group.

4. A compound as claimed in claim 1, wherein X is an aminophenyl group and Y is a hydrogen atom.

References Cited

UNITED STATES PATENTS 3,578,705  5/1971  Wendler et al. _____ 260—343.2

JOHN M. FORD, Primary Examiner

U.S. Cl. X.R.

424—279